Feb. 23, 1965

M. C. WILSON ETAL 3,171,117

DIGITAL TRANSLATING CIRCUITS

Filed Aug. 14, 1959

INVENTOR.
MERTON CARR WILSON
CARL P. SPAULDING

BY Christie, Parker & Hale
ATTORNEYS

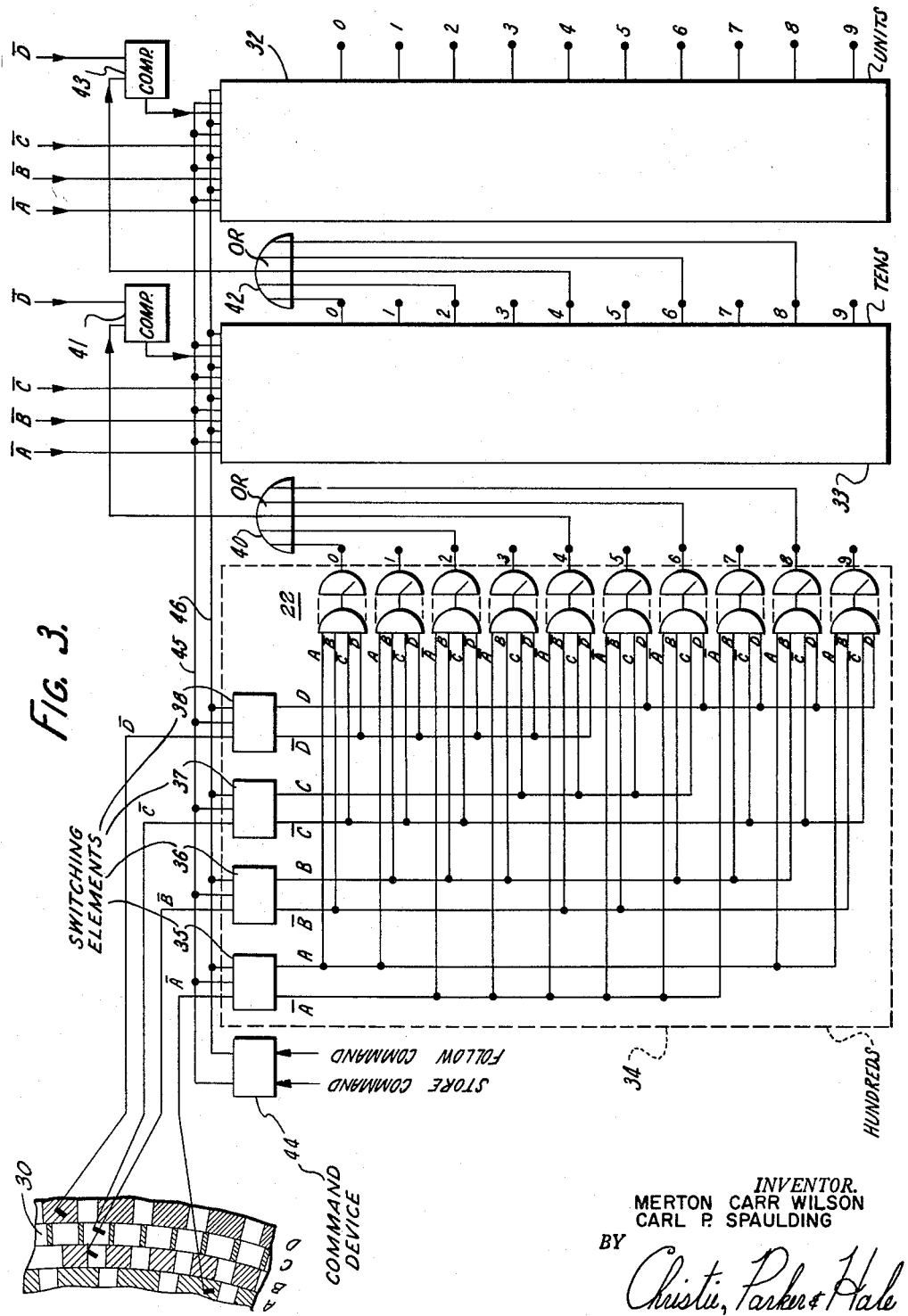

United States Patent Office 3,171,117
Patented Feb. 23, 1965

3,171,117
DIGITAL TRANSLATING CIRCUITS
Merton Carr Wilson, Pasadena, and Carl P. Spaulding, San Marino, Calif., assignors to Datex Corporation, Monrovia, Calif., a corporation of California
Filed Aug. 14, 1959, Ser. No. 833,777
3 Claims. (Cl. 340—347)

This invention relates to numerically controlled positioning systems and digital circuits therefor. In one of its more particular aspects, the invention relates to code translators particularly adapted for use in digitally controlled positioning systems.

The numerical control of machine motions such as those of a tool, a work table, a test probe or the like begins with the command. All such commands are expressed as numbers chosen from a code established for that purpose. These command numbers are read into the positioning system when a machine operation is to be initiated. In addition to the input command, numerically controlled equipment requires a feedback device to inform the positioning system when the command has been accomplished or the relative state thereof. The information derived from the command and the feedback device are compared to give the difference in position between the two. Before the difference between the command and the feedback signal may be provided both signals must be converted to some common language so that they may be compared directly. The comparison device may be a subtraction circuit and which subtraction circuit not only tells whether the feedback signal is greater or less than the command, but also provides a numerical signal which indicates the relative magnitude of the two. This difference can be converted from digital to analog form and used to drive a conventional analog prime mover or servo.

In general, the feedback signal from the member being positioned is derived from an analog to digital encoder. When the analog to digital converter takes the form of a shaft position encoder it has been found convenient to use a coded disc therefor defined in terms of a cyclic or monostrophic code. It is well known that in order to perform arithmetic operations that information represented by the cyclic codes are not readily adaptable thereto. Accordingly, when a subtraction circuit is used along with an encoder, a translator is needed to translate the cyclic feedback information from the cyclic coding to some decimal or coded decimal representation common to the positioning command for use in the subtractor.

This invention is related to the subject matter of an earlier filed application entitled Digital Coding and Translating System, filed on March 9, 1954, bearing Serial No. 415,058, and assigned to the same assignee as this invention. This earlier filed application relates to digital coding and translating systems wherein relay networks or trees are used throughout. Although the circuits described in this earlier filed application are satisfactory, circuits capable of operating at higher speeds and also requiring less power are continually being sought. In particular when the relay circuits are arranged with an encoder the current requirements of relay circuitry are such that it shortens the useable life of the encoders. Accordingly, digital circuits more compatible with present day circuit techniques, such as transistor circuits are required.

This invention provides an improved numerically controlled positioning system including a subtraction circuit for comparing signals and a translator for changing the coding of the signals derived from an analog to digital converter or encoder. The translator circuits associated with the encoders can be defined by means of transistor switching and logical circuits whereby the output of these circuits can conveniently drive other transistor circuits and perform functions not readily available with relay circuits. The use of transistorized translator circuits results in smaller and lighter weight units and which units require less power. Along with the lower power, less current is passed through the encoder contacts thereby giving the encoders a longer life.

In one of its more particular aspects, this invention translates a coded signal such as a cyclic binary coded decimal signal derived from the encoders to a signal representative of a decimal number. The signal may further be encoded to represent a decimal number in a conventional 8421 binary code for processing in the positioning system. It has been found convenient for use in these positioning systems to translate the cylic coded signals from the encoders in two steps, namely, to a decimal number and then to a binary coded decimal number for use in the subtraction circuits. The convenience involved in this method of translation is readily apparent when it is considered that the decimal output indications may be connected to visual indicating means to display to the operator the actual position of the member being positioned.

The translation of the cyclic binary coded decimal bits derived from the encoder are applied to a plurality of switching elements having a single input circuit and a pair of output circuits. The switching circuits are arranged to continually record or store the binary bits of information as they are derived from the encoder. To this end the switching circuits may comprise monostable switching elements arranged to continually follow the input signals. The signals derived from these switching elements are defined in terms of the received signal and its complement in order to translate the signal to the required decimal indication. To this end, each of the output circuits from the switching elements are arranged in a unique combination of four bits with individual control gates for defining the decimal number. Upon the simultaneous occurrence of all the signals in the unique combination the correct decimal digit is indicated at the output of a single gating circuit having a unique output. When the encoder disc is coded in terms of a cyclic binary coded decimal, that is the decimal digit is cyclic it must be converted back to a normal or Arabic decimal by complementing the least significant bit. To this end, the outputs of the control gates representative of an odd decimal digit are coupled by means of a complementing circuit to the least significant digit of the next lower order translators to complement that circuit input whereby the correct decimal digit may be derived therefrom.

These and other features of the present invention may be more fully appreciated when considered in the light of the following specification and drawings, in which:

FIG. 3 is a block-circuit diagram of a translating unit showing a portion of a coded disc for an encoder;

Figure 1:
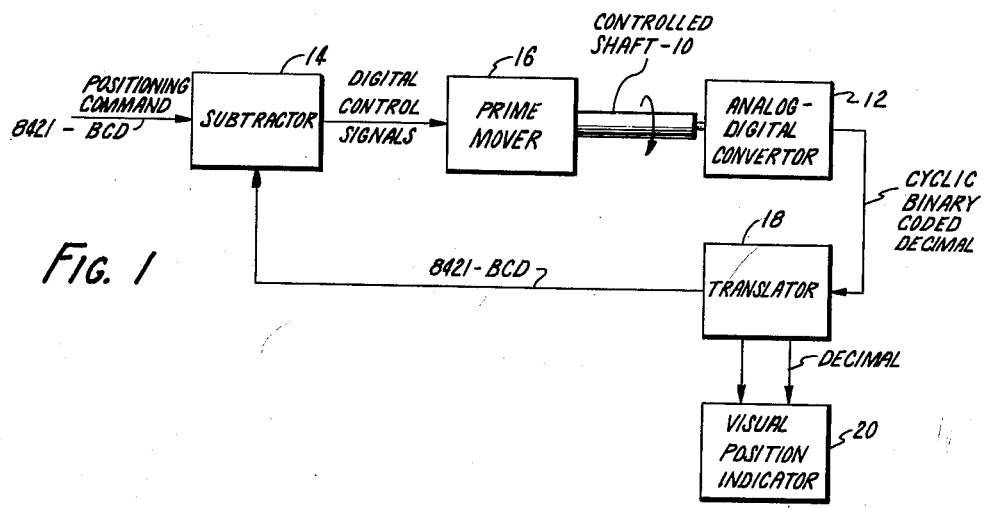
FIG. 1 is a block diagram of the numerically controlled positioning system and embodying the invention.

Now referring to the drawings the invention will be described in more detail. The general numerical control positioning system embodying the invention is illustrated in FIG. 1. The element under control is shown as a rotatable shaft 10. The position of the shaft 10 may be remotely controlled by an operator by means of a positioning command and which positioning command may be derived from a keyboard arranged in a decimal system and translated to a binary coded decimal command. The positioning command is compared with a feedback signal provided by an analog to digital converter 12 coupled to the controlled shaft 10. The feedback signal provided by the analog to digital converter 12 is compared with the positioning command by means of a subtraction circuit 14. The subtraction circuit provides the necessary control signals for actuating a prime mover 16, which in turn is coupled to position the shaft 10 in accordance with with the positioning command supplied to the system. Since the positioning command is presented to the subtractor 14 in a binary-coded decimal fashion and it is generally convenient to code the analog to digital converters in a cyclic binary fashion, a translator 18 is necessary to provide the correct binary coded decimal representation of the actual position of the shaft 10 for comparison in the subtractor 14. The translator 18 may in addition provide a decimal indication of the actual position and which indication may be coupled to a visual position indicator 20 to allow the operator to be continually aware of the relationship of the controlled shaft 10 and the positioning command.

Before further examining the circuit details of the above numerically controlled positioning system, some of the circuit elements for the system will be examined a little more closely. The cyclic coding system utilized for the analog to digital converter 12 and its ordinary decimal equivalent is illustrated in Table I.

*Table I*

| Arabic Number | Decimal Code | Cyclic Binary Coded Decimal | | |
|---|---|---|---|---|
| | | 100's ABCD | 10's ABCD | 1's ABCD |
| 0 | 0 | x000 | x000 | x000  A $\bar{B}$ $\bar{C}$ $\bar{D}$ |
| 1 | 1 | | | xx00  A B $\bar{C}$ $\bar{D}$ |
| 2 | 2 | | | 0x00  $\bar{A}$ B $\bar{C}$ $\bar{D}$ |
| 3 | 3 | | | 0xx0  $\bar{A}$ B C $\bar{D}$ |
| 4 | 4 | | | 00x0  $\bar{A}$ $\bar{B}$ C $\bar{D}$ |
| 5 | 5 | | | 00xx  $\bar{A}$ $\bar{B}$ C D |
| 6 | 6 | | | 0xxx  $\bar{A}$ B C D |
| 7 | 7 | | | 0x0x  $\bar{A}$ B $\bar{C}$ D |
| 8 | 8 | | | xx0x  A B $\bar{C}$ D |
| 9 | 9 | | x000 | x00x  A $\bar{B}$ $\bar{C}$ D |
| 10 | 19 | | xx00 | x00x |
| 11 | 18 | | | xx0x |
| 12 | 17 | | | 0x0x |
| 13 | 16 | | | 0xxx |
| 14 | 15 | | | 00xx |
| 15 | 14 | | | 00x0 |
| 16 | 13 | | | 0xx0 |
| 17 | 12 | | | 0x00 |
| 18 | 11 | | | xx00 |
| 19 | 10 | | xx00 | x000 |
| 20 | 20 | | 0x00 | x000 |
| 21 | 21 | | 0x00 | xx00 |
| 28 | 28 | | 0x00 | xx0x |
| 29 | 29 | | 0x00 | x00x |
| 30 | 39 | | 0xx0 | x00x |
| 31 | 38 | | 0xx0 | xx0x |
| 98 | 91 | x000 | x00x | xx00 |
| 99 | 90 | x000 | x00x | x000 |
| 100 | 190 | xx00 | x00x | x000 |
| 101 | 191 | xx00 | x00x | xx00 |
| 109 | 199 | xx00 | x00x | x000 |
| 110 | 189 | xx00 | xx00 | x000 |
| 111 | 188 | xx00 | xx00 | xx00 |

Table I indicates in the left hand column the conventional decimal numbers identified as Arabic numbers for clarity. The coding of the converter 12 in a cyclic code is accomplished in this instance by first converting the Arabic number to a cyclic decimal number. As disclosed in the above-identified earlier filed application, this translation of Arabic numbers results in only one decimal digit changing when going from one decimal number to the next. For example, the change from the decimal number 9 in the cyclic decimal code results in the decimal digit 19 rather than 10 as in the Arabic system. Similarly the Arabic number 11 corresponds to the 18 in the cyclic decimal system, etc. This translation may be effected according to rules 1 and 2 stated as follows:

(1) An Arabic decimal digit that follows an even Arabic digit is not changed;
(2) An Arabic decimal digit that follows an odd Arabic digit is changed to the 9's complement when it is written in the cyclic decimal code.

It should also be noted that the most significant number of any number is not changed because it always follows a zero (even number) understood.

The rules for translating from cyclic decimal to Arabic decimal are very similar to the above translation and it is only necessary to remember that the clue for complementing is always taken from the next more significant Arabic digit. To translate the cyclic number 341 to its Arabic equivalent 358 according to the above rules, the most significant digit 3, the hundreds digit, is the same in both systems since zero is understood before the 3. Since 3 is an odd number, the tens order cyclic number 4 is complemented so the Arabic equivalent is 5. Considering the Arabic number 5 now to arrive at the least significant digit, or units digit, of the Arabic equivalent, since this is also an odd number the cyclic number 1 is 9's complemented to give the decimal number 8; and the Arabic equivalent 358.

The above cyclic decimal code may then be arranged in terms of a binary code as shown in the right hand columns of Table I. Each of the 10 cyclic decimal digits are coded in terms of 10 unique combinations of four binary bits. It should be noted that the combinations 0000 and xxxx or 1111 are not utilized. The zeros illustrated in the table correspond to an open contact when the analog to digital converter 12 is an encoder and that the x represents a closed contact or a binary one in a normal binary notation. These binary bits may be further identified as the ABCD bits reading from left to right. It will be noted upon examining the binary coding that only one binary bit changes in going from one decimal number to the next for all of the binary bits shown including the hundreds, tens, and units orders, and provides a cyclic binary coded decimal notation. This binary coding also has the feature that the 9's complement of the binary number may be formed by inverting the fourth binary bit or the "D" bit. This feature simplifies the translation from a cyclic decimal system to the Arabic decimal system.

Figure 2:
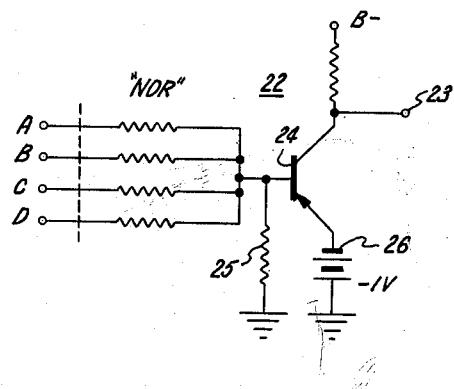
FIGS. 2 and 2a are schematic circuit representations and the symbol for a gating circuit utilized in the invention.

Referring to FIG. 2, a gating circuit 22 identified as a NOR gating circuit is illustrated. The NOR gating circuit has a single output terminal 23 and a plurality of input circuits identified as ABC and D corresponding to the binary bits for coding a decimal digit. The input terminals and the output terminals are interconnected by means of a group of separate resistors for the terminals ABCD and connected in parallel to the base circuit for a switching transistor 24. The output terminal 23 is connected to the collector electrode for the transistor 24. The base circuit is also provided with a resistor 25 connected to ground while the emitter is connected to a minus one volt bias source shown as the battery 26. The collector is shown as connected to a negative potential, B minus, through a usual dropping resistor. It will be evident that a negative potential applied to any one of the input circuits ABC or D will cause a current to flow in the emitter-collector circuit of the transistor 24. Such a current flow will cause the transistor 24 to become saturated and thereby causing the collector potential to approach ground level. Since as indicated in Table I, the coding of a decimal digit requires a unique combination of four binary bits, the translation of a binary coded decimal digit to its corresponding decimal number may be accomplished through the use of such a NOR circuit 22. The unique output at the terminal 23 representative of a decimal digit must necessarily be at other than ground level, in this instance a relatively large negative potential. The input circuits ABC and D have been proportioned to require that they must all be at ground level simultaneously in order to cut off the current conduction of the transistor 24. Upon the occurrence of this coincidental relationship of the input signals the collector circuit for the transistor 24 will assume the desired negative potential to thereby indicate the reception of the corresponding decimal digit.

Figure 2A:
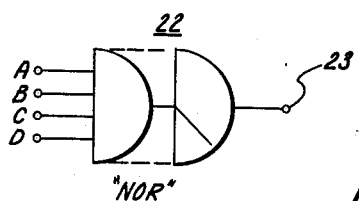

FIG. 2a indicates a symbol representative of the NOR gating circuit of FIG. 2 and which symbol is utilized to simplify the remaining illustrations.

Now referring to FIG. 3, the circuit details for the translator 18 for changing the cyclic binary coded decimal signals derived from the converter 12 and which converter is shown as a coded disc 30 made up of conductive and non-conductive segments. The contact closures (binary 1) result when the sensing devices or brushes engage a conductive segment while an open circuit condition (binary 0) results when the brushes sense a non-conductive segment. The coded disc 30 is mounted on a rotatable shaft and which shaft is in turn coupled to the controlled shaft 10. It will be understood that the coded disc 30 is arranged to provide one thousand shaft positions. Only the portion of the coded disc 30 and the associated brushes therefor coresponding to the hundreds order for the translator 18 is shown.

The translator 18 comprises similar translating elements for the units digit 32, the tens digit 33, and the hundreds digit 34 for defining any one of the one thousand shaft positions. Since the translating elements 32, 33 and 34 are similar the circuit details for the hundreds unit 34 is the only one illustrated. It will be understood that the same circuit configuration holds true for the tens element 33 and the units element 32. The four brushes sensing the coded disc 30 are coupled to four switching elements identified by the general reference characters 35, 36, 37 and 38 and which brushes are further identified as providing the binary coded signals $\bar{A}$ $\bar{B}$ $\bar{C}$ and $\bar{D}$ to these respective switching elements. The switching elements 35–38 are arranged to be continuously responsive to the signals provided by the disc 30. That is, as the disc 30 is rotated by the controlled shaft 10 and the brushes travel from a conductive to a non-conductive segment or vice versa the sensed signal is applied to the switching elements 35–38 whereby they indicate the correct position of the controlled shaft 10 at any time. This mode of operating the switching elements 35–38 may be termed a follow mode. It will be recognized by those skilled in the art that the switching elements 35–38 may comprise monstable switching elements or flip flops. Each of the switching elements include output circuits to indicate not only the binary character of the signal delivered thereto but also its binary complement. Considering switching element 35 as typical, it will be seen that the output circuits are identified reading from left to right as $\bar{A}$ and A. The delivery of the $\bar{A}$ signal corresponds to a sensed open contact (0) and the A signal to a sensed closed contact (x). The ouput circuits are alternately at high and low voltage levels to correspond to the received signal.

The switching elements 35–38 are arranged with a plurality of NOR circuits shown in symbolic form in accordance with the symbol of FIG. 2a. Each of these NOR gating elements 22 represent a separate decimal digit reading from zero to nine from the top to the bottom as shown in FIG. 3. The four input circuits for each of these NOR gating elements 22 are connected to a unique combination of the output signals, eight in number, from the switching elements 35–38. The unique combination for each decimal digit corresponds to the coding for these digits shown in Table I hereinabove. For example, the Arabic number zero is shown in its cyclic binary code as x000 or expressed as A $\bar{B}$ $\bar{C}$ $\bar{D}$. Accordingly, the four input circuits to the NOR gate 22 representing the decimal digit zero can be seen as connected to the A output of switching element 35, the $\bar{B}$ output of the switching element 36, the $\bar{C}$ output of the switching element 37, and the $\bar{D}$ output of the switching element 38. In this fashion the input connections for the NOR gates 22 representative of the decimal digits one through nine may be traced in view of the coding of Table I to indicate the combination of input signals required to provide a unique output indication representing the decimal digit delivered to the switching elements 35–38.

Figure 5:
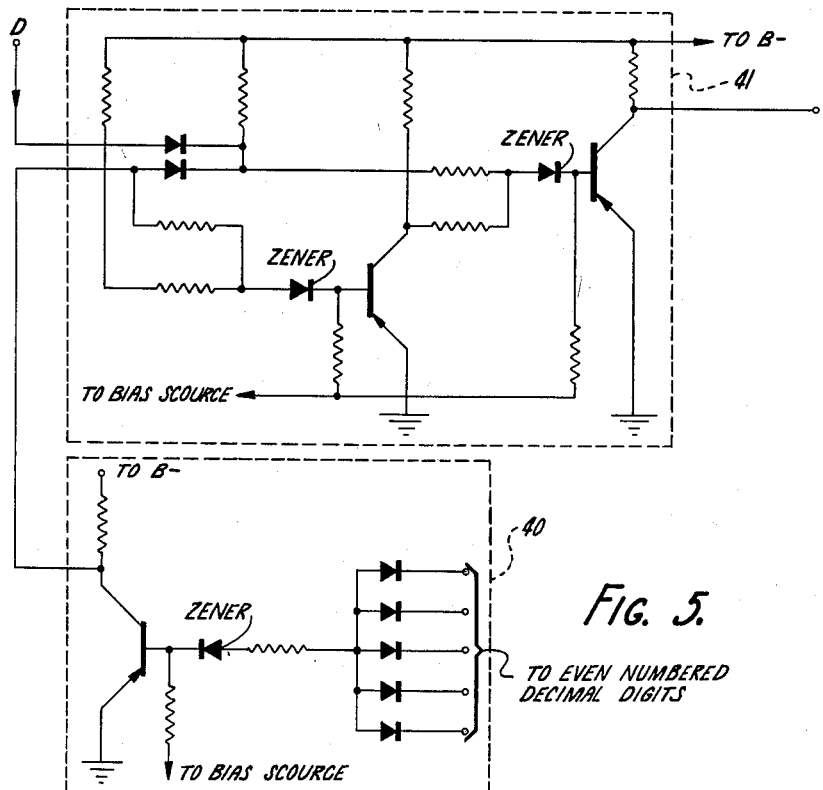
FIG. 5 is a schematic circuit diagram of the complementing arrangement for FIG. 3.

It should be noted that since the binary coding of the decimal numbers was performed upon the cyclic decimal code as described hereinabove, it is necessary in order to indicate the correct Arabic number to translate the decimal indications appearing at the output from the NOR gates 22 to the Arabic number system. Due to the property of the binary code, this may be accomplished by complementing the fourth binary bit or the D bit of the lowest decimal orders as indicated in the example and rules hereinabove. Also, it is noted that the complementing is necessary only when the Arabic digit for the next highest order is an odd number. However, in this instance due to the inversion provided at the output of the NOR gate 22 it is necessary to sense the even digits and to inhibit the complementing action. Accordingly, each of the output circuits of the NOR gates representative of the digital bits 0, 2, 4, 6 and 8 are connected to an OR circuit 40. The single output from the OR circuit 40 is connected as an input signal to the complementing circuit shown as a half adder 41. The remaining input signal to the half adder 41 is the D signal derived from the coded disc 30 for the 10's order. The half adder circuit 41 is of well known construction and may be considered as an exclusive OR circuit for this application. For completeness the OR circuit 40 and half adder 41 are shown in FIG. 5. The half adder circuit 41 functions to complement the $\bar{D}$ signal delivered thereto unless the higher order or 100's order digit is an even number. In this same fashion the even numbered decimal digits from the tens unit 33 is coupled to an OR gate 42 cooperating with a half adder circuit 43. It should be recognized that although the complementing or inverting of the D bit is illustrated as occurring prior to delivery of the D bit to the switching elements that it could be included at the output of the switching element for this bit.

An important feature of this translating unit is the ability to control the switching elements 35–38 to either continuously follow and translate signals derived from the coded disc 30 or to store the signals derived therefrom upon the application of an external command for this purpose. To this end a command device 44 is utilized to receive a store command or a follow command and applies the voltages to the corresponding store and follow busses, identified by the reference numbers 45 and 46 respectively to condition the switching elements for each of the decimal orders to provide the commanded operation. A more complete description of the store-follow circuitry and operation may be had by reference to the co-pending application of C. P. Spaulding and M. C. Wiison entitled "Digital Circuits," filed on April 13, 1959, bearing Serial No. 805,868, now Pat. No. 3,133,279, and assigned to the same assignee as this application.

With the above structure in mind, the operation of the translating unit will be examined in more detail. It will be assumed that the cyclic binary coded decimal number 341 has been derived from the disc 30 for translating to the Arabic equivalent numeral. The hundreds order signal, will appear as the signals 0xx0 or $\bar{A}$ B C $\bar{D}$. Accordingly, the NOR gate 22 representative of the decimal digit 3 will have a unique output signal to indicate the reception of this decimal digit in the hundreds unit 34. Since a zero is understood, no complementing is necessary. The tens unit 33 will receive the binary coded digit 4, as 00x0 or $\bar{A}$ $\bar{B}$ C $\bar{D}$ at the respective inputs to the switching elements for this decimal order. Since the hundreds order was an odd number 3 a signal from the OR circuit 40 is not applied to the complementing circuit 41 and accordingly the $\bar{D}$ signal delivered thereto will be complemented and the output indication of the switching elements for the unit 33 will read as $\bar{A}$ $\bar{B}$ C D. This output indication from the switching elements will be seen to provide a unique output signal at the NOR gate for the decimal number 5 rather than the decimal number 4 prior to complementing the D bit. It will be recognized that the decimal number 5 is the 9's complement of the decimal number 4. In this same fashion the signals delivered to the units element 32 are controlled whereby the cyclic decimal coding for the digit 1 will be translated to give an output indication representative of the Arabic digit 8, whereby the complete translation of the cyclic decimal digit to the equivalent Arabic decimal digit 358 will have occurred.

It should also be noted at this point that the decimal orders 32–34 and their respective decimal output indications may be connected to the visual indicator 20 for digitally indicating to the operator the actual position of the controlled shaft 10.

As indicated in the generalized system of FIG. 1, the subtractor 14 is operative upon binary coded decimal command digits which are coded in accordance with the 8421 binary coding system. Accordingly, the decimal digits derived from the translating units 32–34 must be further translated into this 8421 binary coded system prior to application to the subtractor 14. It will also be recognized that the subtraction process is generally accomplished through the addition of the complement of a number. In this instance the subtraction may be accomplished by adding the 15's complement of the signal derived from the converter 12. The circuit for performing this translation for a single decimal order is shown in FIG. 4.

Figure 4:
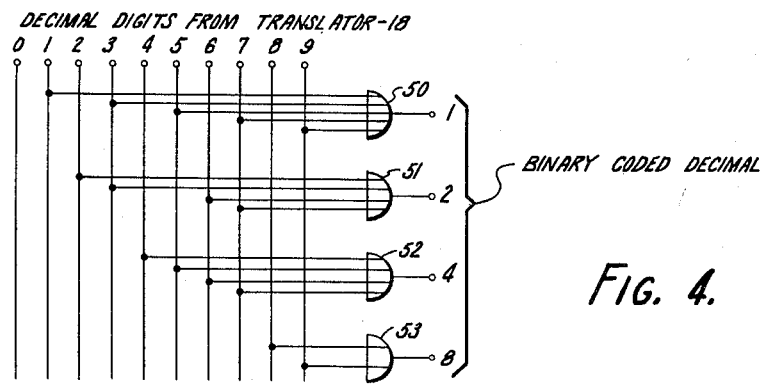
FIG. 4 is a schematic circuit diagram of a translator for use with the translator of FIG. 3.

Reference to FIG. 4 indicates a terminal for each decimal digit zero through 9 and the connections to four OR circuits 50, 51, 52 and 53 corresponding to the respective binary weighting 1, 2, 4, and 8. The OR circuits 50–53 are connected to be responsive to the signals appearing at the terminals for the decimal outputs that are unique to the binary coding thereof in terms of the 8421 code. The appearance of an output signal at any one of the OR circuits 50–53 is indicative of a binary 1 while an absence of a signal therefrom is indicative of a binary zero. Accordingly, since the decimal number zero is represented by the binary coding 0000 in the 8421 system it will be recognized that the decimal digit zero should not be connected to any of the OR circuits 50–53, as shown in FIG. 4. Accordingly, the OR circuit 50 will be seen to be connected to the odd decimal numbered terminals for the digits 1, 3, 5, 7 and 9, while the OR circuit 51 is connected to the decimal output terminals for the digits 2, 3, 6 and 7. In the same fashion the OR circuit 52 is connected to the output terminals for the digits 4, 5, 6, and 7 and the OR circuit 53 is connected to the output terminals for the digits 8 and 9.

The translation of the decimal number 358 to the 8421 binary system will be effected by this translating unit as follows. When the decimal number 3 is delivered to a similar unit representative of the hundreds unit the OR circuits 50 and 51 will provide an output indication and accordingly the output signal from this translation arrangement will read 0011 in the 8421 system. In this same fashion the decimal number 5 will provide output indications at OR circuits 50 and 52 whereby the output signal will read 0101, while the decimal number 8 will solely energize the OR circuit 53 whereby the output indication reads 1000.

Although the translation of the decimal digits into the 8241 system is shown and described for translating into the direct equivalent thereof the same circuit logic and elements may be utilized to generate the complement of the decimal signal delivered thereto. When the 15's complement is necessary for the subtraction process, the connections to the OR circuits 50–53 will be arranged to be responsive to the decimal digit signals to provide a binary coded signal that is the complement of the decimal digit received. Upon delivery of the decimal digit 3 instead of providing an output indication reading as 0011, the complement thereof will be provided by this modified arrangement and will read as 1100. To provide such an output indication it will be recognized that the output terminal for the decimal digit 3 will be coupled to the OR circuits 52 and 53 in lieu of the circuits 50 and 51. In this same fashion the remainder of the decimal digits may be coupled into the OR circuits 50–53 to provide the desired complementary output.

It will now be recognized that the invention has advanced the state of the art through the provision of an improved control system including a transistorized code translator therefor.

What is claimed is:

1. A translating circuit for use with a source of cyclic binary coded decimal signals representative of a decimal number having a plurality of decimal orders, said circuit having a plurality of transistor switching elements for each decimal order connected in a parallel circuit relationship with said source to be continuously switchably responsive to said binary coded signals, said switching elements being further characterized as continuously electrically indicating the binary character of the received signal and its binary complement, a NOR gate for each decimal number of each decimal order connected to be responsive to the received signals and their binary complements from said switching elements, each of said NOR gates having a single output circuit and a predetermined number of input circuits connected to be coincidentally responsive to a different combination of the received signals and said complementary signals derived from said switching elements to provide a unique output signal representative of the decimal digit provided by said source, and circuit means connected between each of the output circuits of the NOR gates representative of an even numbered decimal digit of a higher decimal order and the input circuit for a preselected switching element of the next lower decimal order to invert the binary character received from said source unless an even numbered digit is received at the higher decimal order.

2. A combination as defined in claim 1 wherein said circuit means includes an OR circuit connected to the even decimal numbers, and a half adder circuit connected to be responsive to said OR circuit and the signal from said source.

3. In combination, a source of cyclic binary coded decimal signals representative of a decimal number having a plurality of decimal orders, a plurality of transistor switching elements for each decimal order connected as monostable circuits in parallel circuit relationship with said source to be continuously responsive to said binary coded signals, said switching elements each having a pair of output circuits for electrically indicating the binary character of the received signal and its binary complement, a control gate for each decimal number of each decimal order connected to be responsive to a preselected combination of the pair of signals from said switching elements, each of said gates having a single output circuit and four input circuits connected to be coincidentally responsive to a different combination of binary coded decimal signals derived from the output circuits of said switching elements to provide a unique output signal representative of the decimal digit provided by said source, and circuit means connected into the input circuit for each decimal order except the highest to complement the same binary character in each decimal order received from said source to cause a translation from a cyclic binary coded decimal to a binary coded decimal, said circuit means including means responsive to the signals representative of the even numbered digits from a higher decimal order in combination with said same binary character, and means responsive to each decimal signal for translating same to binary coded signals arranged in terms of the 8421 notation.

References Cited in the file of this patent

UNITED STATES PATENTS

| | | |
|---|---|---|
| 2,571,680 | Carbrey | Oct. 16, 1951 |
| 2,758,788 | Yaeger | Aug. 14, 1956 |
| 2,852,745 | Kohs | Sept. 16, 1958 |
| 2,860,327 | Campbell | Nov. 11, 1958 |
| 2,873,439 | Lahti | Feb. 10, 1959 |
| 2,907,019 | Merlin | Sept. 29, 1959 |
| 2,909,769 | Spaulding | Oct. 20, 1959 |
| 2,975,409 | Petherick | Mar. 14, 1961 |

OTHER REFERENCES

"Transistors, A New Class of Relays," Control Engineering, December 1956, pp. 70–76.

Transactions of AIEE, November 1953, vol. 72, Part I, "A Progressive Code Digital Quantizer," Floyd Raasch, pages 567–571.